US005160956A

United States Patent [19]
Watanabe et al.

[11] Patent Number: 5,160,956
[45] Date of Patent: Nov. 3, 1992

[54] LENS BARREL WITH SCREW MOUNT

[75] Inventors: Kenji Watanabe; Tetsuo Sekiguchi; Takayasu Shishido, all of Tokyo, Japan

[73] Assignee: Asahi Kogaku Kogyo Kabushiki Kaisha, Tokyo, Japan

[21] Appl. No.: 637,645

[22] Filed: Jan. 4, 1991

[30] Foreign Application Priority Data

Jan. 17, 1990 [JP] Japan .................................. 2-7917

[51] Int. Cl.$^5$ .............................................. G03B 17/00
[52] U.S. Cl. ...................................... 354/286; 359/825
[58] Field of Search ............... 359/702, 703, 704, 705, 359/706, 825, 826; 354/286, 195.1, 195.12

[56] References Cited

U.S. PATENT DOCUMENTS

| | | | |
|---|---|---|---|
| 2,691,322 | 10/1954 | Wittel | 359/825 |
| 4,640,579 | 2/1987 | Takizawa | 359/826 |

FOREIGN PATENT DOCUMENTS

| | | |
|---|---|---|
| 49-48761 | 12/1974 | Japan . |
| 55-27850 | 7/1980 | Japan . |
| 58-37042 | 8/1983 | Japan . |

*Primary Examiner*—L. T. Hix
*Assistant Examiner*—David M. Gray
*Attorney, Agent, or Firm*—Sandler, Greenblum & Bernstein

[57] ABSTRACT

A lens barrel is provided having a screw mount. The lens barrel includes a mount ring having a threaded portion, which can be engaged by a corresponding screw mount of the camera body to which the lens barrel is to be attached, a focus adjusting ring which is rotatably supported by the mount ring, a barrel body which is screw-engaged by the focus adjusting ring to support a focus adjusting lens, a linear movement guide member which is rotatably supported by the mount ring to restrict the movement of the barrel body so as to move only in the optical axis direction of the focus adjusting lens, and a frictional resisting member which resists the rotational movement of the linear movement guide member relative to the mount ring. The frictional resisting member provides a resistance so that when the focus adjusting ring is rotated, no rotation of the linear movement guide member relative to the mount ring takes place, and when the rotational force is applied to the barrel body, the linear movement guide member can be rotated relative to the mount ring.

18 Claims, 4 Drawing Sheets

LENS BARREL WITH SCREW MOUNT

BACKGROUND OF THE INVENTION

1. Field of the Invention

The present invention relates to a lens barrel which can be connected to a camera body through a screw mount, and more precisely, it relates to a lens barrel having a screw mount in which the angular position thereof upon mounting to the camera body can be adjusted.

2. Description of Related Art

When a lens barrel having a screw mount is attached to a camera body through a screw mount, the relative angular position thereof is not constant. Accordingly, it is necessary to provide a special position adjusting mechanism in order to adjust the angular position of the lens barrel relative to the camera body. For instance, in a known monitoring camera, a lens barrel has a lens supporting body having a screw mount which is rotatable relative to the lens supporting body, so that after the angular position of the lens supporting body relative to a screw mount of a camera body is adjusted, the relative position is fixed by a set screw. However, in such a known position adjusting mechanism there are drawbacks: a tool such as a screw driver must be used to fasten and loosen the set screw, it is difficult for a beginner to precisely adjust the angular position, and it is necessary to repeat the same adjustment in order to readjust the angular position. Furthermore, to improve the appearance of the set screw which is exposed, it is preferable to make the set screw of plastics. However, due to a local concentration of stress on the set screw, it is impractical to use such an inexpensive plastic set screw.

SUMMARY OF THE INVENTION

The primary object of the present invention is to provide a lens barrel having a screw mount in which the angular position thereof can be easily adjusted without using a special tool after the lens barrel is mounted to a camera body.

Another object of the present invention is to provide a lens barrel having a screw mount in which a reduced local concentration of stress is caused upon adjustment of the relative angular position.

To achieve the objects mentioned above, according to the present invention, there is provided a lens barrel having a screw mount comprising a mount ring having a threaded portion which can be engaged by a corresponding screw a mount of a camera body to which the lens barrel is to be attached. A focus adjusting ring is rotatably supported by the mount ring, and a barrel body is screw-engaged by the focus adjusting ring to support a focus adjusting lens. A linear movement guide member is rotatably supported by the mount ring to restrict the movement of the barrel body so as to move only in the optical axis direction of the focus adjusting lens. A frictional resisting mechanism is provided for resisting the rotational movement of the linear movement guide member. relative to the mount ring. The frictional resisting mechanism provides a resistance which is determined so that when the focus adjusting ring is rotated, no rotation of the linear movement guide member relative to the mount ring takes place, and when the rotational force is applied to the barrel body, the linear movement guide member can be rotated relative to the mount ring.

With this arrangement, even after the mount ring is attached to the camera body, the angular position of the mount ring can be optionally adjusted by applying the rotational force on the barrel body.

Preferably, a focus lock mechanism is provided between the barrel body and the focus adjusting ring to prevent the relative rotation thereof. Consequently, no accidental displacement of the focal position takes place during the adjustment of the angular position of the mount ring.

Upon focusing, the focus adjusting ring is rotated so that the barrel body which is guided by the linear movement guide member is moved in the optical axis direction.

As can be seen from the foregoing, according to the present invention, the direction (i.e., angular position) of the mount ring can be adjusted by rotating the barrel body after the mount ring is screw-engaged in the camera body. On the other hand, the focusing can be effected by rotating the focus adjusting ring. Accordingly, neither additional element, a set screw or a special tool such as a screw-driver, is necessary to adjust the angular position of the mount ring. Furthermore, since no local concentration of stress, which would otherwise occur on the takes place on the set screw, it is possible to make the barrel body and the focus adjusting ring, etc., of plastics, thus resulting in a decrease in the manufacturing cost.

By providing a focus lock mechanism, the angular position of a lens frame for moving the focus adjusting lens (lens assembly) can be easily adjusted without changing the focal position.

The present disclosure relates to the subject matter contained in Japanese patent application Ser. No. 2-7917 (filed on Jan. 17, 1990) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

Figure 1:
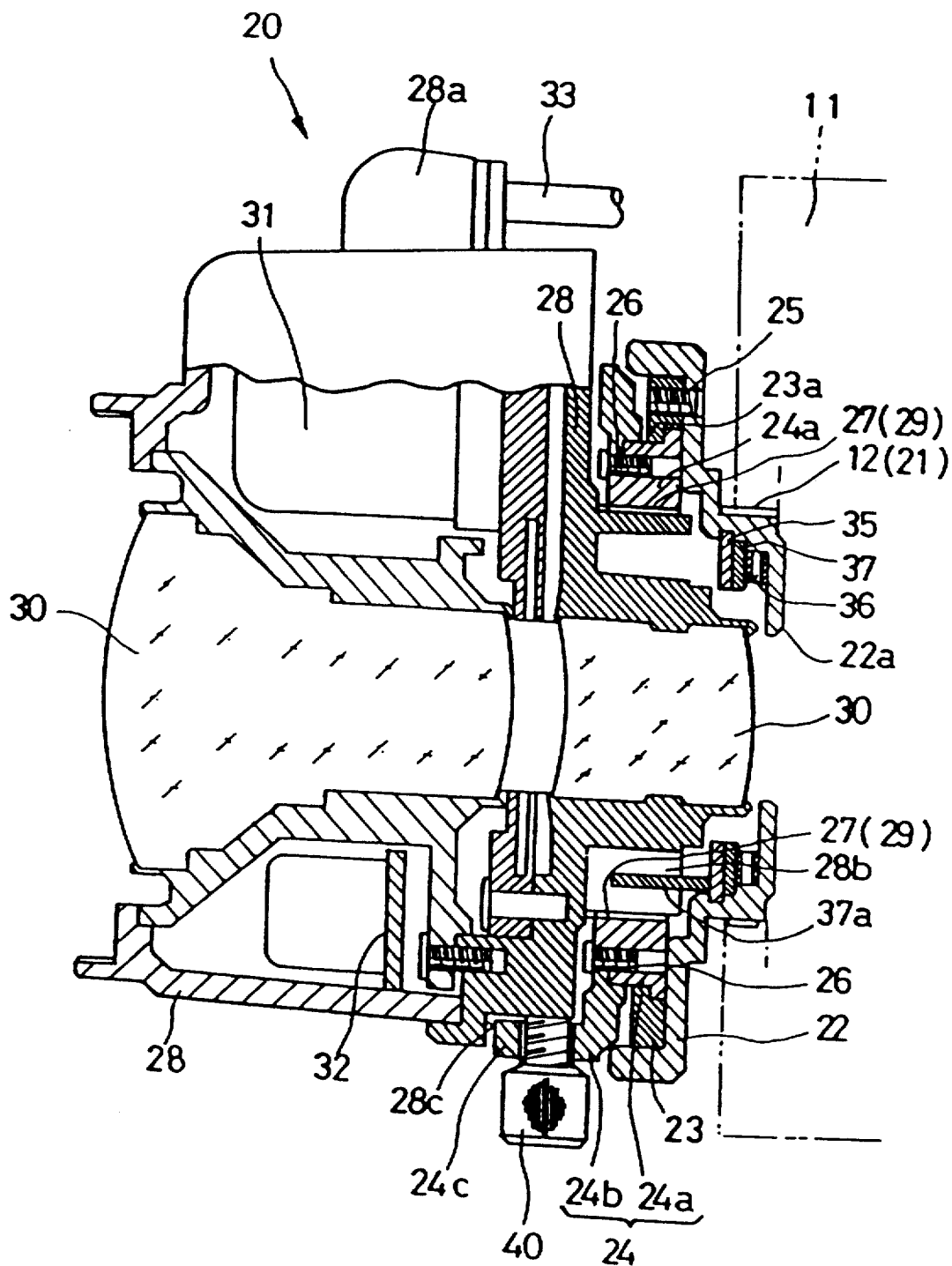
FIG. 1 is a longitudinal sectional view of a lens barrel with a screw mount, according to an aspect of the present invention.

The illustrated embodiments which will be described below are applied to a monitoring Camera (ITV camera).

The lens barrel 20 with a screw mount according to the present invention is provided on its rear end with a mount ring 22 having a threaded portion 21. The threaded portion 21 of the mount ring 22 can be screw-engaged by a screw mount 12 of a camera body 11. The mount ring 22 is immovable when the threaded portion 21 is completely engaged by the screw mount 12 of the camera body 11.

A focus adjusting ring 24 is rotatably held in the mount ring 22 through an annular retainer 23 so as not to move in the optical axis direction. The focus adjusting ring 24 has an adjusting ring body 24a, which is rotatably held between a flange 23a of the annular retainer 23 and the mount ring 22, and an operational ring 24b. The annular retainer 23 is secured to the mount ring 22 by a set screw 25. The operational ring 24b is rotatable relative to the adjusting ring body 24a and can be fixed to the adjusting ring body 24a after the angular position is adjusted and fixed.

The adjusting ring body 24a has a central female helicoid 27 in which a male helicoid 29 of the lens barrel body 28 is screw engaged. On the lens barrel body 28 are provided a focus adjusting lens group 30, an auto iris diaphragm 31, a substrate block 32 thereof and an electrical conductor 33, etc. The lens barrel body 28 has a radial projection 28a which serves as a connector to the electrical conductor 33.

The mount ring 22 is provided on its inner end, adjacent to the camera body 11, with a linear movement guide ring 37 which is supported between a retaining ring 35 and a wave washer 36 so as to prevent the guide ring 37 from coming out of the mount ring 22. The wave washer 36 is compressed between an inner flange 22a of the mount ring 22 and the linear movement guide ring 37 to resist the rotation of the linear movement guide ring 37. The linear movement guide ring 37 has a rotational movement restricting leg 37a which extends in a direction parallel to the optical axis of the lens. The leg 37a is fitted in a linear movement guide groove 28b which is formed in the lens barrel 28 to extend in a direction parallel to the optical axis. The resistance to the rotational movement of the linear movement guide ring 37 by the wave-washer 36 is such that when the rotational force is applied to the focus adjusting ring 24, the linear movement guide ring 37 does not rotate, but when the rotational force is manually applied to the lens barrel 28, the linear movement guide ring 37 is rotated relative to the mount ring 22. In an example, the focus adjusting ring 24 and the linear movement guide ring 37 (lens barrel body 28) were rotated by a torques of 0.3 Kg-cm and 1.5 Kg-cm respectively, by the resistance of the wave-washer 36.

The operational ring 24b of the focus adjusting ring 24 has a projection 24c which extends forward, so that a radially extending focus lock screw 40 is screwed in the projection 24c. The focus lock screw 40 is opposed at its front end to lens barrel body 28, so that when the focus lock screw 40 is strongly pressed against the lens barrel body 28, the focus adjusting ring 24 is secured to the lens barrel body 28. The projection 24c is located in a circumferential recess 28c formed in the lens barrel body 28 within a predetermined angular range to restrict the angular displacement of the focus adjusting ring 24.

The screw mount type of lens barrel 20 of the present invention operates as follows.

Figure 2:
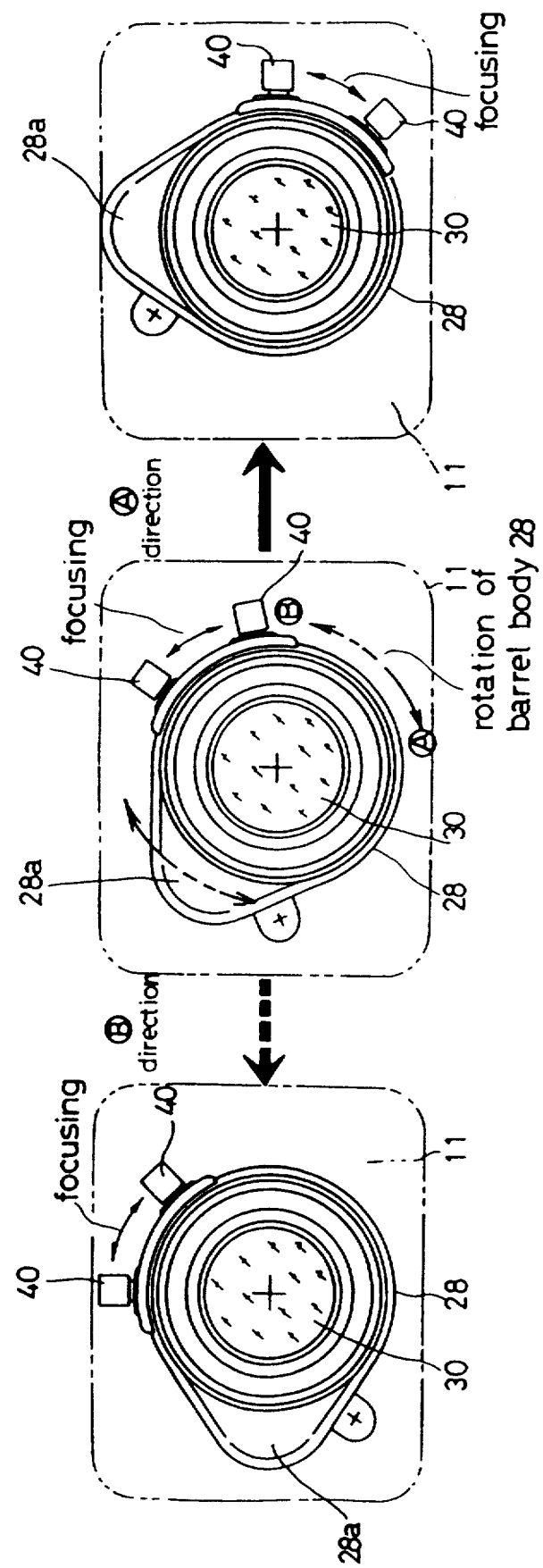
FIG. 2 is a front elevational view of a lens barrel with a screw mount, shown in FIG. 1, according to the present invention.

Upon mounting the lens mount 20 to the camera body 11, the threaded portion 21 of the mount ring 22, which is held by an operator, is fully engaged in the screw mount 12 of the camera body 11, so that the mount ring 22 is immovably connected to the camera body 11. In this state, the lens barrel body 28 is manually rotated in a desired direction to adjust the direction (angular position) of the radial projection 28a of the lens barrel body 28 (FIG. 2). Since the rotation restricting leg 37a of the linear movement 37 is fitted in the corresponding linear movement guide groove 28b of the lens barrel body 28, so that the lens barrel body is circumferentially integral with the linear movement guide ring 37, the linear movement guide ring 37 can be rotated together with the lens barrel body 28 against the resistance caused by the wave-washer (i.e., frictional member) 36. Namely, the direction of the lens barrel body 28 can be optionally adjusted.

Upon focusing after the completion of the adjustment of the direction of the lens barrel body 28, the focus lock screw 40 is loosened to make it possible to rotate the focus adjusting ring 24. Since the focus adjusting ring 24 is functionally connected to the lens barrel body 28 through the female and male helicoids, 27 and 29 respectively, and the rotation of the lens barrel body 28 is restricted by the linear movement guide ring 37, the lens barrel body 28 is wholly moved in the optical axis direction to effect the focusing. Namely, when the rotational force is applied to the focus adjusting ring 24, the linear movement guide ring 37 does not rotate due to the resistance applied thereto by the wave-washer 36. Consequently, when the focus adjusting ring 24 is rotated, the lens barrel body 28 is linearly moved in the optical axis direction guided by the engagement of the rotation restricting leg 37a and the linear movement guide groove 28b to effect the focusing. The focusing can be effected while manually holding the loosened focus lock screw 40.

To adjust the direction of the lens barrel body 28 without changing the focus state, the focus lock screw 40 is fastened to make the focus adjusting ring 24 integral with the lens barrel body 28, and then the lens barrel body 28 is rotated.

Although the frictional member is in the form of the wave-washer 36 in the above-mentioned and illustrated embodiment, the frictional member is not limited thereto and can be made of, for example, a wave-shaped wire spring or friction ring or the like. Namely, any frictional member which has the above-mentioned friction property can be used.

Figure 3:
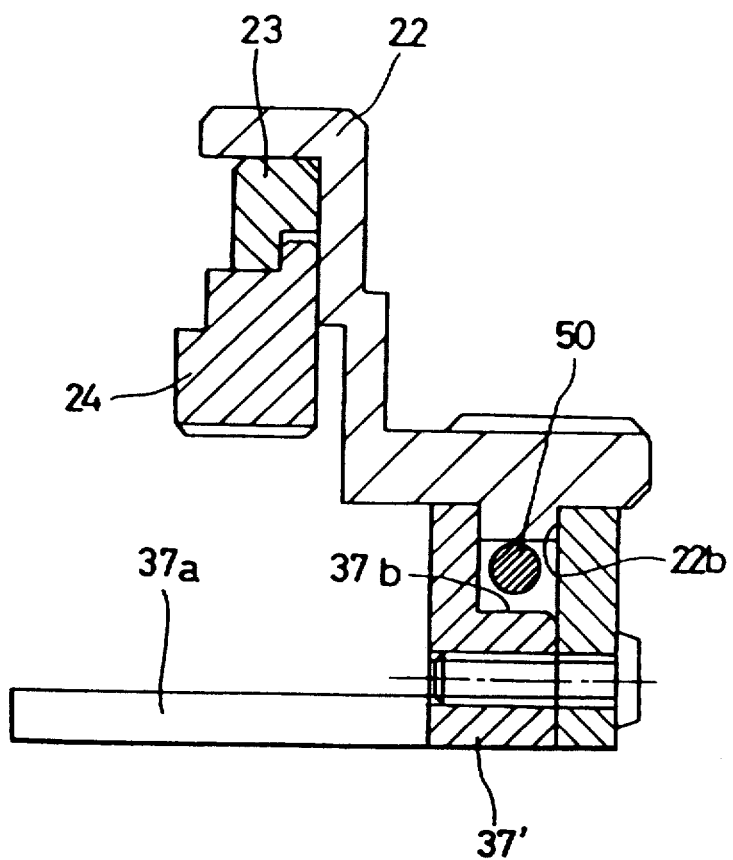
FIG. 3 is a longitudinal sectional view of a frictional resisting means according to another aspect of the present invention; and, FIG. 4 is a front elevational view of a wire spring which constitutes a frictional resisting means, shown in a free state, according to the present invention.
Figure 4:
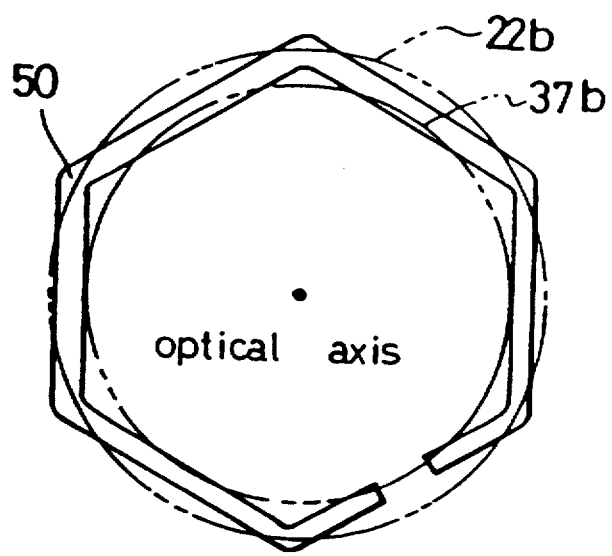

FIGS. 3 and 4 show another embodiment of the frictional member. In FIGS. 3 and 4, the frictional member is realized by a wire spring 50 having a polygonal shape (e.g. hexagonal shape in the illustrated embodiment) in plan view in its free state. The maximum and minimum diameters of the wire spring 50 are larger and smaller than the inner diameter of the corresponding annular portion 22b of the mount ring 22 and the outer diameter of the corresponding annular portion 37b of the linear movement guide ring 37, respectively. Consequently, the wire spring (frictional member) 50 is deformed when it is inserted between the annular portions 22b and 37b to produce the frictional force. Thus, the wire spring 50 functions similarly to the wave-washer 36 in the above-mentioned embodiment shown in FIGS. 1 and 2.

We claim:

1. A lens barrel having a screw mount comprising:
   a mount ring having a threaded portion engagable by a corresponding screw mount of a camera body to which the lens barrel is to be attached;
   a focus adjusting ring which is rotatably supported by said mount ring;
   a barrel body which is screw-engaged by said focus adjusting ring to support a focus adjusting lens;
   a linear movement guide member which is rotatably supported by said mount ring to restrict the movement of said barrel body so as to move only in the optical axis direction of the focus adjusting lens; and, frictional resisting means for resisting the rotational movement of said linear movement guide member relative to said mount ring;

said frictional resisting means providing a resistance so that when the focus adjusting ring is rotated, no rotation of said linear movement guide member relative to said mount ring takes place, and when the rotational force is applied to said barrel body, said linear movement guide member can be rotated relative to said mount ring.

2. A lens barrel according to claim 1, further comprising a focus lock means which is provided between said barrel body and said focus adjusting ring for holding said barrel body and said focus adjusting ring so as not to rotate relative to each other.

3. A lens barrel according to claim 1, wherein said barrel body is provided with a linear movement guide groove which extends in a direction parallel to the optical axis.

4. A lens barrel according to claim 3, wherein said linear movement guide member is provided with a rotation restricting leg, which extends in a direction parellel to the optical axis, to be fitted in the linear movement guide groove of said barrel body.

5. A lens barrel according to claim 1, wherein said linear movement guide member is provided with an annular portion concentrical to the optical axis.

6. A lens barrel according to claim 5, wherein said frictional resisting means comprises a wave-washer which comes into frictional contact with the annular portion of said linear movement guide member to resist said linear movement guide member.

7. A lens barrel according to claim 5, wherein said frictional resisting means comprises a wire spring which is inserted between an outer peripheral surface of the annular portion of said linear movement guide member and an inner peripheral surface of said barrel body to come into frictional contact with said barrel body.

8. A lens barrel according to claim 7, wherein said wire spring has a polygonal shape in plan view in its free state.

9. A lens barrel according to claim 8, further comprising a restricting means for restricting the movement of said focus adjusting ring in the optical axis direction.

10. A lens barrel having a screw mount comprising:
a mount ring engagable by a screw mount of a camera body to which the lens barrel is to be attached;
a barrel body which supports a focus adjusting lens and which is linearly movable in the optical axis direction of the focus adjusting lens and separately rotatable relative to said mount ring;
a focus adjusting means for adjusting the axial position of said barrel body in the optical axis direction; and a frictional resisting means for preventing said barrel body from being rotated relative to said mount ring upon adjusting the axial position of said barrel body by the said focus adjusting means and for permitting said barrel body to rotate relative to said mount ring when a rotational force is applied to said barrel body.

11. A lens barrel according to claim 10, further comprising a linear movement guide ring which is rotatable relative to said mount ring.

12. A lens barrel according to claim 11, wherein said frictional resisting means is supported by said linear movement guide ring so as to linearly move in the optical axis direction.

13. A lens barrel according to claim 12, wherein said frictional resisting means comprises a wave-washer which comes into frictional contact with said linear movement guide ring to resist the rotation of said linear movement guide ring.

14. A lens barrel according to claim 12, wherein said frictional resisting means comprises a wire spring which is inserted between an outer peripheral surface of said linear movement guide ring and an inner peripheral surface of said barrel body to come into frictional contact with said barrel body.

15. A lens barrel according to claim 14, wherein said wire spring has a polygonal shape in plan view in its free state.

16. The lens barrel having a screw mount according to claim 10, comprising means for focusing said focus adjusting lens by movement of said barrel body in the optical axis direction with respect to said mount ring.

17. The lens barrel having a screw mount according to claim 10, further comprising means for locking said barrel body in a predetermined position with respect to said focus adjusting means.

18. A lens barrel having a screw mount comprising:
a mounting ring engageable by a screw mount of a camera body to which said lens barrel is adapted to be attached;
a barrel body adapted for supporting a focus adjusting lens, said barrel body comprising means for enabling linear movement of said barrel body in an optical axis direction of the focus adjusting lens without rotation, and means for rotating said barrel body relative to said mount ring;
a focus adjusting means for adjusting the axial position of said barrel body in the optical axis direction; and
means for preventing said barrel body from rotation relative to said mount ring upon movement of said barrel body in the optical axis direction by said focus adjusting means, and for permitting rotation of said barrel body with respect to said mount ring upon application of a rotational force to said barrel body.

* * * * *

UNITED STATES PATENT AND TRADEMARK OFFICE
CERTIFICATE OF CORRECTION

PATENT NO. : 5,160,956
DATED : November 3, 1992
INVENTOR(S) : K. Wantanabe et al It is certified that error appears in the above-indentified patent and that said Letters Patent is hereby corrected as shown below:

On the title page, item [73] Assignee: after "Japan", please append --, and Asahi Seimitsu Kabushiki Kaisha, Tokyo, Japan--.

Signed and Sealed this

Ninth Day of August, 1994

Attest:

BRUCE LEHMAN

*Attesting Officer*   *Commissioner of Patents and Trademarks*